(12) United States Patent
Zhuge et al.

(10) Patent No.: US 11,887,325 B2
(45) Date of Patent: Jan. 30, 2024

(54) FACE IMAGE PROCESSING METHOD AND APPARATUS, READABLE MEDIUM, AND ELECTRONIC DEVICE

(71) Applicant: BEIJING BYTEDANCE NETWORK TECHNOLOGY CO., LTD., Beijing (CN)

(72) Inventors: Jingjing Zhuge, Beijing (CN); Qingshuai Yang, Beijing (CN); Xuan Li, Beijing (CN)

(73) Assignee: BEIJING BYTEDANCE NETWORK TECHNOLOGY CO., LTD.

( * ) Notice: Subject to any disclaimer, the term of this patent is extended or adjusted under 35 U.S.C. 154(b) by 212 days.

(21) Appl. No.: 17/616,961

(22) PCT Filed: Nov. 6, 2020

(86) PCT No.: PCT/CN2020/127260
§ 371 (c)(1),
(2) Date: Dec. 6, 2021

(87) PCT Pub. No.: WO2021/139382
PCT Pub. Date: Jul. 15, 2021

(65) Prior Publication Data
US 2022/0327726 A1    Oct. 13, 2022

(30) Foreign Application Priority Data
Jan. 6, 2020    (CN) .......................... 202010010716.5

(51) Int. Cl.
*G06T 7/70*    (2017.01)
*G06T 7/50*    (2017.01)
(Continued)

(52) U.S. Cl.
CPC .................. *G06T 7/70* (2017.01); *G06T 7/13* (2017.01); *G06T 7/50* (2017.01); *G06T 7/60* (2013.01);
(Continued)

(58) Field of Classification Search
None
See application file for complete search history.

(56) References Cited

U.S. PATENT DOCUMENTS

2011/0102626 A1*  5/2011  Inada ..................... G06V 40/19
                                                                348/222.1
2017/0262970 A1    9/2017  Chen et al.
(Continued)

FOREIGN PATENT DOCUMENTS

CN    106249413 A    12/2016
CN    107563353 A    1/2018
(Continued)

OTHER PUBLICATIONS

Iueyuzhishen (2019) "How to get the effect of eye light with tiktok" [online] Jun. 19, 2019, website: https://jingyan.baidu.com/article/77b8dc7f4d60ef6174eab63a.html.
(Continued)

*Primary Examiner* — Kee M Tung
*Assistant Examiner* — Jed-Justin Imperial

(57) ABSTRACT

A face image processing method and apparatus, a readable medium, and an electronic device, relates to the field of image processing technologies. The method includes: obtaining (101) sight line information in a face image to be processed in accordance with a preset recognition algorithm, where the sight line information includes: a first coordinate and an edge coordinate for an eye, and the edge coordinate is used to indicate an intersection of a sight line of an eye and an edge of the face image; determining (102) a target area in
(Continued)

---

1021 — Determining a first distance according to a depth of field distance, and determining a second distance according to an image size of the face image 1022 — Taking, a rectangular area including the sight line segment and having width of the first distance, and length of the second distance, as the target area the face image according to the sight line information, where the target area includes a sight line segment with the first coordinate and the edge coordinate as endpoints; and rendering (103) a preset effect material to target area to obtain a target image.

20 Claims, 10 Drawing Sheets

(51) Int. Cl.
*G06T 7/13* (2017.01)
*G06V 40/16* (2022.01)
*G06V 10/22* (2022.01)
*G06T 7/60* (2017.01)
*G06T 15/00* (2011.01)

(52) U.S. Cl.
CPC ............ *G06T 15/00* (2013.01); *G06V 10/225* (2022.01); *G06V 40/165* (2022.01); *G06T 2207/30201* (2013.01)

(56) References Cited

U.S. PATENT DOCUMENTS

| | | | | |
|---|---|---|---|---|
| 2018/0335930 | A1* | 11/2018 | Scapel | G06V 20/20 |
| 2019/0130166 | A1 | 5/2019 | Wang | |
| 2019/0385290 | A1 | 12/2019 | Yang | |
| 2020/0150759 | A1* | 5/2020 | Zhang | G06F 3/017 |

FOREIGN PATENT DOCUMENTS

| | | |
|---|---|---|
| CN | 107909057 A | 4/2018 |
| CN | 107909058 A | 4/2018 |
| CN | 108958610 A | 12/2018 |
| CN | 109584152 A | 4/2019 |
| CN | 110378839 A | 10/2019 |
| CN | 110378847 A | 10/2019 |
| CN | 110555798 A | 12/2019 |
| CN | 111243049 A | 6/2020 |
| JP | 2009282931 A | 12/2009 |
| JP | 2011049988 A | 3/2011 |

OTHER PUBLICATIONS

Liuzhiyuan special effect teaching network (2018) "AE teaching is cheap and practical! Everyone knows the laser eye effect" [online] Sep. 8, 2018, website: https://www.sixvfx.com/easy_2d_cyclops.
Ok software park (2019) "Tiktok, gourd baby, how to make the best of the two eyes? How to make a photography course?" [online] Feb. 26, 2019, website: www.mnw.cn/keji/mi/2132746.html.
Dark horse fan group (2019) "X-Men—laser eye production analysis" [online] Aug. 22, 2019, website: http://bbs.itheima.com/thread-471037-1-1.html.
International Application No. PCT/CN2020/127260, International Search Report dated Feb. 10, 2021, 11 pages with English Translation.
Chinese Patent Application No. 202010010716.5, First Office Action dated Sep. 15, 2020, 7 pages.
Chinese Patent Application No. 202010010716.5, Second Office Action dated Dec. 9, 2020, 9 pages.
Office Action dated Dec. 6, 2022 in Japanese Patent Application No. 2021-571584, with English translation (5 pages).
Examination Report dated Aug. 11, 2022 in Indian Patent Application No. 202127055698, with English translation (6 pages total).

* cited by examiner

FACE IMAGE PROCESSING METHOD AND APPARATUS, READABLE MEDIUM, AND ELECTRONIC DEVICE The present application is a National Stage of International Application No. PCT/CN2020/127260, filed on Nov. 6, 2020, which claims priority to Chinese Patent Application No. 202010010716.5, titled "FACE IMAGE PROCESSING METHOD AND APPARATUS, READABLE MEDIUM, AND ELECTRONIC DEVICE", filed to China National Intellectual Property Administration on Jan. 6, 2020, both of the above applications are hereby incorporated by reference in their entireties.

TECHNICAL FIELD

The present application relates to the field of image processing technologies and, more specifically, to a face image processing method and apparatus, a readable medium, and an electronic device.

BACKGROUND

With the continuous development of terminal technologies and image processing technologies, there are more and more image processing operations that can be provided on a terminal device. In order to meet the different requirements of a user, a terminal device can add various effects on an image containing a face, for example, it can render effects of radiating, light-emitting, and weeping at eyes in an image. However, the rendering effects for eyes are typically displayed fixedly near the position where the eyes are located, which cannot reflect the real state of the eyes.

SUMMARY

The purpose of the present application is to provide a face image processing method and apparatus, a readable medium, and an electronic device, for solving a technical problem that in existing face image processing methods, rendering effects can only be fixedly displayed near the position where eyes are located when performing rendering for the eyes, which cannot reflect the real state of the eyes.

The summary part is provided to introduce concepts in a brief form, and these concepts will be described in detail in the following description of embodiments part. This summary part is not intended to identify key features or essential features of the claimed technical solution, nor is it intended to be used to limit the scope of the claimed technical solution. In a first aspect, the present disclosure provides a face image processing method, the method including:
  obtaining sight line information in a face image to be processed in accordance with a preset recognition algorithm, where the sight line information includes: a first coordinate and an edge coordinate for an eye, and the edge coordinate is used to indicate an intersection of a sight line of the eye and an edge of the face image;
  determining a target area in the face image according to the sight line information, where the target area includes a sight line segment with the first coordinate and the edge coordinate as endpoints; and
  rendering a preset effect material to the target area to obtain a target image.

In a second aspect, the present disclosure provides a face image processing apparatus, the apparatus including:
  an obtaining module, configured to obtain sight line information in a face image to be processed in accordance with a preset recognition algorithm, where the sight line information includes: a first coordinate and an edge coordinate for an eye, and the edge coordinate is used to indicate an intersection of the sight line of the eye and an edge of the face image;
  a first determining module, configured to determine a target area in the face image according to the sight line information, where the target area includes a sight line segment with the first coordinate and the edge coordinate as endpoints; and
  a rendering module, configured to render a preset effect material to the target area to obtain a target image.

In a third aspect, the present disclosure provides a computer-readable medium, which stores a computer program thereon which, when executed by a processing apparatus, implements steps of the method described in the first aspect of the present disclosure.

In a fourth aspect, the present disclosure provides an electronic device, including:
  a storage apparatus, which stores a computer program thereon;
  a processing apparatus, configured to execute the computer program in the storage apparatus, to implement the steps of the method described in the first aspect of the present disclosure.

Through above technical solutions, in the present disclosure: firstly recognizing a face image to be processed in accordance with a preset recognition algorithm to obtain sight line information including a first coordinate and an edge coordinate for an eye, where the edge coordinate is used to indicate an intersection of a sight line of the eye and an edge of the face image; then determining a target area including a sight line segment with the first coordinate and the edge coordinate as endpoints in the face image according to the sight line information; finally rendering a preset effect material to the target area to obtain a target image. In the present disclosure, through identifying the sight line information included in the face image, determining the target area that needs to be rendered, then rendering the effect material to the target area, so that the rendering effect can follow the sight line of an eye.

Other features and advantages of the present disclosure will be described in detail in the following description of embodiments part.

BRIEF DESCRIPTION OF THE DRAWINGS

The above and other features, advantages, and aspects of embodiments of the present disclosure will become more apparent in conjunction with the accompanying drawings and with reference to the following description of embodiments part. Throughout the accompanying drawings, identical or similar reference numbers designate identical or similar elements. It should be understood that the accompanying drawings are schematic, and components and elements have not necessarily been drawn to scale. In the accompanying drawings.

DESCRIPTION OF EMBODIMENTS

Embodiments of the present disclosure will be described in more detail below with reference to the accompanying drawings below. Although some embodiments of the present disclosure are shown in the accompanying drawings, it should be understood that the present disclosure can be implemented in various forms and should not be construed as being limited to the embodiments set forth herein. On the contrary, these embodiments are provided for a more thorough and comprehensive understanding of the present disclosure. It should be understood that the accompanying drawings and embodiments of the present disclosure are merely used for exemplary purposes and are not intended to limit the protection scope of the present disclosure.

It should be understood that the various steps recited in method implementations of the present disclosure may be executed in a different order, and/or executed in parallel. In addition, method implementations may include additional steps and/or omit execution of steps shown. The scope of the present disclosure is not limited in this respect.

The term "including" and variants thereof used herein are open-ended, that is, "including but not limited to". The term "based on" is "based at least in part on". The term "an embodiment" means "at least one embodiment"; the term "another embodiment" means "at least one another embodiment"; and the term "some embodiments" means "at least some embodiments". Related definitions of other terms will be given in the following description.

It should be noted that the concepts of "first", "second" and the like mentioned in the present disclosure are merely used to distinguish different apparatuses, modules or units, and are not used to limit sequence or interdependence relationship of functions performed by these apparatuses, modules or units.

It should be noted that the modifier of "one" and "a plurality of" mentioned in the present disclosure are illustrative and not restrictive, and those skilled in the art should understand that they should be understood as "one or a plurality of", unless clearly indicated otherwise in the context.

The names of messages or information exchanged among a plurality of apparatuses in implementations of the present disclosure are merely used for illustrative purposes, and are not used to limit the scope of these messages or information.

Figure 1:
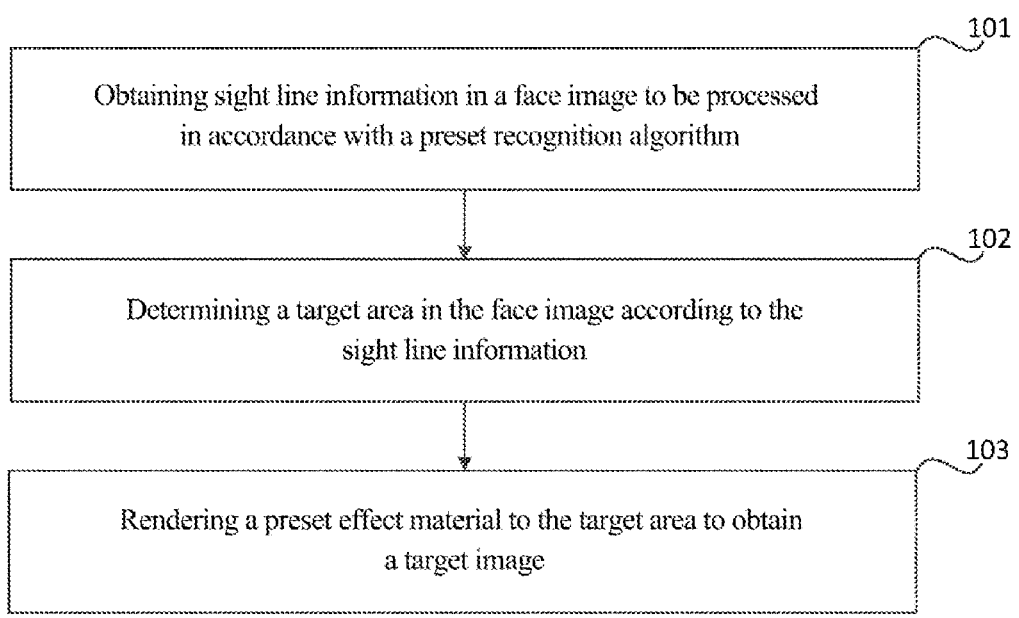
FIG. 1 is a flowchart of a face image processing method shown according to an exemplary embodiment.

FIG. 1 is a flowchart of a face image processing method shown according to an exemplary embodiment. As shown in FIG. 1, the method includes:

step 101: obtaining sight line information in a face image to be processed in accordance with a preset recognition algorithm, where the sight line information includes: a first coordinate and an edge coordinate for an eye, and the edge coordinate is used to indicate an intersection of a sight line of an eye and an edge of the face image.

For instance, the face image to be processed may be, for example, a piece of picture including a face captured by a user through a terminal device, or a frame of image including a face in a video captured through a terminal device, as well as a piece of image including a face selected by a user on a display interface of a terminal device. Firstly, sight line information included in a face image is recognized in accordance with a preset recognition algorithm. The recognition algorithm can firstly recognize a face in a face image, and then further determine a position of an eye in the face, and finally obtain the sight line information. The sight line information can describe a sight line of an eye, for example, it may include a first coordinate of the eye on the face image, and an edge coordinate of an intersection of a sight line of the eye and an edge of the face image on the face image. The direction of the sight line (i.e., which direction that an eye look towards) can be described through the first coordinate and the edge coordinate. The sight line included in the face image takes the first coordinate as the starting point and the edge coordinate as the end point. It should be noted that the face image can include one or a plurality of faces, and each face can include two eyes, so each eye corresponds to a sight line. Correspondingly, each sight line corresponds to a set of first coordinate and edge coordinate. It can be understood that when a face image includes N eyes, N pieces of the sight line information are obtained in step 101, and each piece of sight line information includes a set of first coordinate and edge coordinate, which is used to describe the sight line of one eye.

Step 102, determining a target area in the face image according to the sight line information, where the target area includes a sight line segment with the first coordinate and the edge coordinate as endpoints.

Exemplarily, a user can select a specified effect (for example, radiating, light-emitting, weeping or the like) through a terminal device. In order to render the specified effect for an eye, it is necessary to determine a target area according to the sight line information in the face image, that is, a position where the specified effect needs to be displayed in the face image. The target area includes a sight line segment with the first coordinate and edge coordinate as endpoints. The target area may be a rectangle or other shapes including the sight line segment. For example, the target area can be a rectangle determined with the midpoint of a sight line segment as center, the length of the sight line segment as length, and the length of an eye as width. The sight line segment can be extended towards the direction of the edge coordinate to obtain an extended line segment that has the same length as the diagonal length of the face image. The target area is a rectangle obtained with the midpoint of the extended line segment as center, the length of the extended sight line segment as length, and a preset width as width.

The target area one-to-one corresponds to the sight line segment. If a face image includes a plurality of eyes (for example, two eyes of a single face in the face image, or a plurality of eyes of multiple faces in the face image), and each eye corresponds to a set of the first coordinate and the edge coordinate, then each set of first coordinate and edge coordinate determines a sight line segment, and accordingly each sight line segment determines a target area, that is, a plurality of target areas is determined in the face image.

Step 103, rendering a preset effect material to the target area to obtain a target image.

Exemplarily, before rendering the target area, an effect material corresponding to a specified effect can be found according to the effect specified by the user in a pre-stored material library. The material library includes therein effect materials corresponding to respective effects of the various effects. The material library can be pre-stored on the terminal device. Or the material library can be stored in a server that the terminal device can access to, and when the terminal device needs to use an effect material corresponding to a certain effect, it can search and obtain the effect material from the server. After determining the effect material, the effect material is taken as a texture map to be rendered into the target area through openGL (Open Graphics Library) to obtain the target image. Since the target area is determined according to the sight line information, the effect material is rendered within the target area, so that the rendering effect can follow the sight line of the eye, which can reflect the real state of the eye.

Further, in order to enable the rendering effect to have a visual 3D (English: 3 Dimensions, Chinese: three-dimensional) effect, the effect material may be set to the material with inconsistent widths at both ends. When the rendering is performed for the target area, the end that has smaller width of the effect material is rendered to the end that closes to the first coordinate (that is, the end that closes to an eye) in the target area, and the end that has larger width of the effect material is rendered to the end that closes to the edge coordinate in the target area. Taking an example where the effect material is radiating, in the target image obtained by that way, radium rays at the end of an eye are thinner, and radium rays at the end of an image edge are thicker, so that a visual 3D effect is produced.

It should be noted that after obtaining the target image, different operations can be performed on the target image according to the different user requirements. For example, the target image can be displayed on a display interface of the terminal device, the target image can be also stored in a designated storage path, or the target image can be sent to a designated server for sharing or the like, which is not particularly limited in the present disclosure.

Figure 2:
FIG. 2 is an effect material shown according to an exemplary embodiment.
Figure 3:
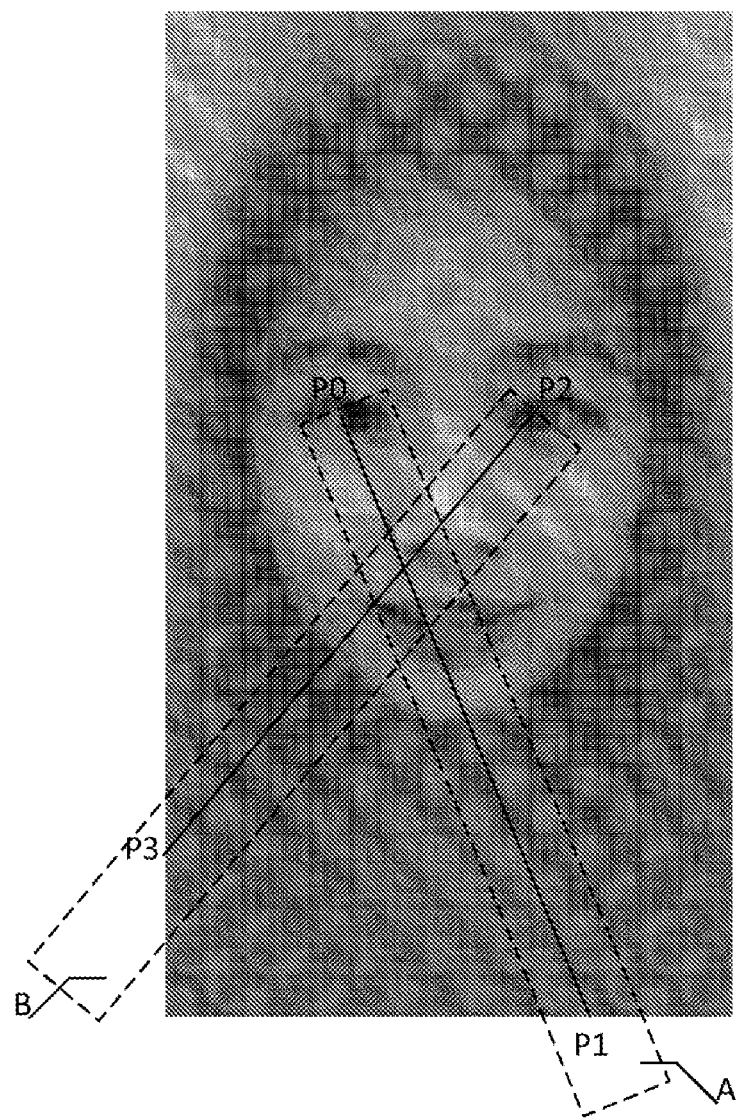
FIG. 3 is a face image shown according to an exemplary embodiment.
Figure 4:
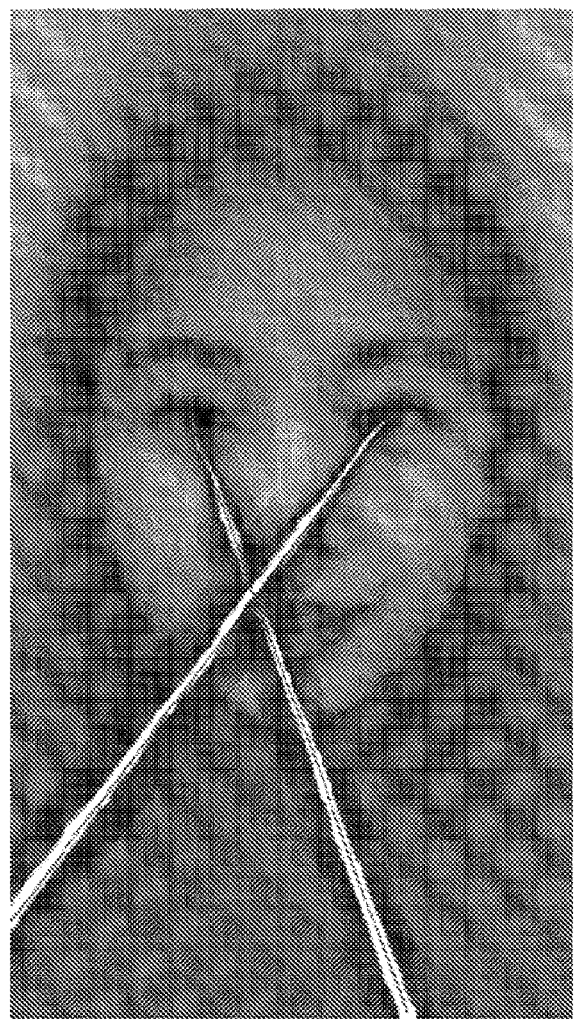
FIG. 4 is a target image shown according to an exemplary embodiment.

Taking an example where the effect material is FIG. 2, and the face image is FIG. 3. Firstly, the first coordinate and the edge coordinate (P0, P1) for the left eye and the first coordinate and the edge coordinate (P2, P3) for the right eye in FIG. 3 are obtained through the recognition algorithm. Then, the target area A corresponding to the left eye and the target area B corresponding to the right eye are determined according to the (P0, P1) and (P2, P3). Finally, FIG. 2 is rendered to target areas A and B respectively to obtain the target image shown as FIG. 4.

In summary, in the present disclosure: firstly recognizing a face image to be processed in accordance with a preset recognition algorithm to obtain sight line information including a first coordinate and an edge coordinate for an eye, where the edge coordinate is used to indicate an intersection of sight line of the eye and an edge of the face image; then determining a target area including a sight line segment with the first coordinate and the edge coordinate as endpoints in the face image according to the sight line information; finally rendering a preset effect material to the target area to obtain a target image. In the present disclosure, through identifying the sight line information included in the face image, determining the target area that needs to be rendered, then rendering the effect material to the target area, so that the rendering effect can follow the sight line of an eye.

Figure 5:
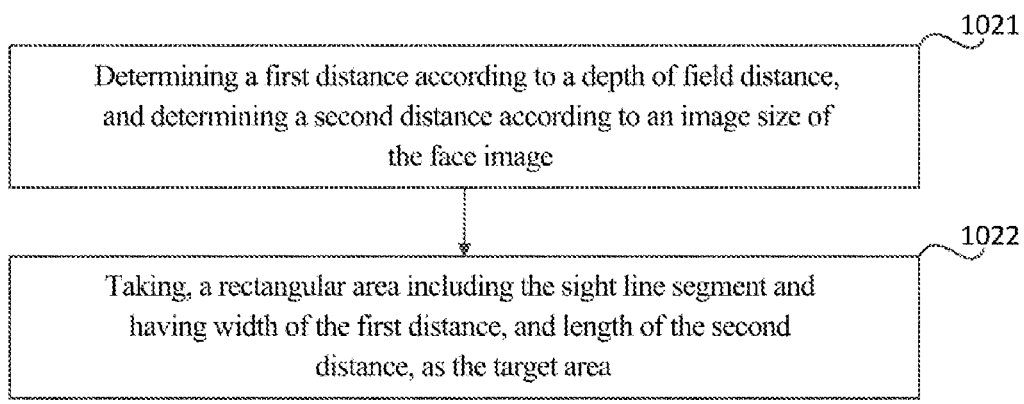
FIG. 5 is a flowchart of another face image processing method shown according to an exemplary embodiment.

FIG. 5 is a flowchart of another face image processing method shown according to an exemplary embodiment. As shown in FIG. 5, the sight line information also includes a depth of field distance, which is a distance between an eye and a lens for capturing the face image. The implementation of step 102 can include:

step 1021, determining a first distance according to the depth of field distance, and determining a second distance according to an image size of the face image, where the first distance is negatively correlated with the depth of field distance, and the second distance is positively correlated with the image size; and step 1022, taking, a rectangular area including the sight line segment and having width of the first distance, and length of the second distance, as the target area.

For example, in order to enable the rendering effect to have a visual 3D effect, the target area can also be determined in combination with a depth of field distance included in the sight line information. The depth of field distance can be understood as a distance between an eye in the face image and a lens that captures the face image. The closer the eye is from the lens, the smaller the depth of field distance is, and the farther the eye is from the lens, the greater the depth of field distance is. Firstly, a first distance is determined according to the depth of field distance, and a second distance is determined according to the image size of the face image; where the first distance is negatively correlated with depth of field distance, and the second distance is positively correlated with the image size. Then, a rectangle including a sight line segment is determined in accordance with the first distance as width and the second distance as length, to be taken as the target area. In this way, the smaller the depth of field distance is, the wider the width of the target area is, and the larger the depth of field distance is, the narrower the width of the target area is.

Specifically, the first distance can be determined according to formula 1:

$$W = \alpha \times \left( \frac{\pi}{2} - \arctan\left(\frac{Z}{\beta}\right) \right) \quad \text{Formula 1}$$

where W represents the first distance, Z represents the depth of field distance, and $\alpha$ and $\beta$ are preset adjustment parameters for adjusting the sensitivity of W varying with Z. Arctangent function $$\arctan\left(\frac{Z}{\beta}\right)$$

is used to limit W to be too large or too small.

In order to avoid the problem that fracture of the effect material occurs on the face image due to the selection of the target area being too small, the target area can be extended out of the range of the face image. Then the second distance can be set to the length of the diagonal of the face image, or the length of the diagonal can be taken as the minimum of the second distance to ensure that the fracture of the effect material will not occur on the face image.

Correspondingly, the implementation of step 103 may be: adjusting a size of the effect material in accordance with the first distance and the second distance, and rendering the adjusted effect material to the target area, to obtain the target image.

Exemplarily, a size of the effect material is adjusted in accordance with the first distance and the second distance. The width of the adjusted effect material is the first distance, and the length of the adjusted effect material is the second distance. Then, the adjusted effect material is taken as a texture map to be rendered to the target area through openGL to obtain the target image. Taking an example where the effect material is radiating. The smaller the depth of field distance is, the wider the width of the target area is, the wider the adjusted effect material is, the wider the radium rays in the target image is. The larger the depth of field distance is, the narrower the width of the target area is, the narrower the adjusted effect material is, the narrower the radium rays in the target image is, thereby producing a visual 3D effect.

Specifically, determining the target area in step 1022 may include the following steps:

step 1), determining a first side, where side length of the first side is the first distance, a midpoint of the first side is the first coordinate, and the first side is perpendicular to the sight line segment;

step 2), determining a second side, where side length of the second side is the second distance, and the second side is perpendicular to the first side; and step 3) taking, a rectangle consisting of the first side and the second side and including the sight line segment, as the target area.

Figure 6:
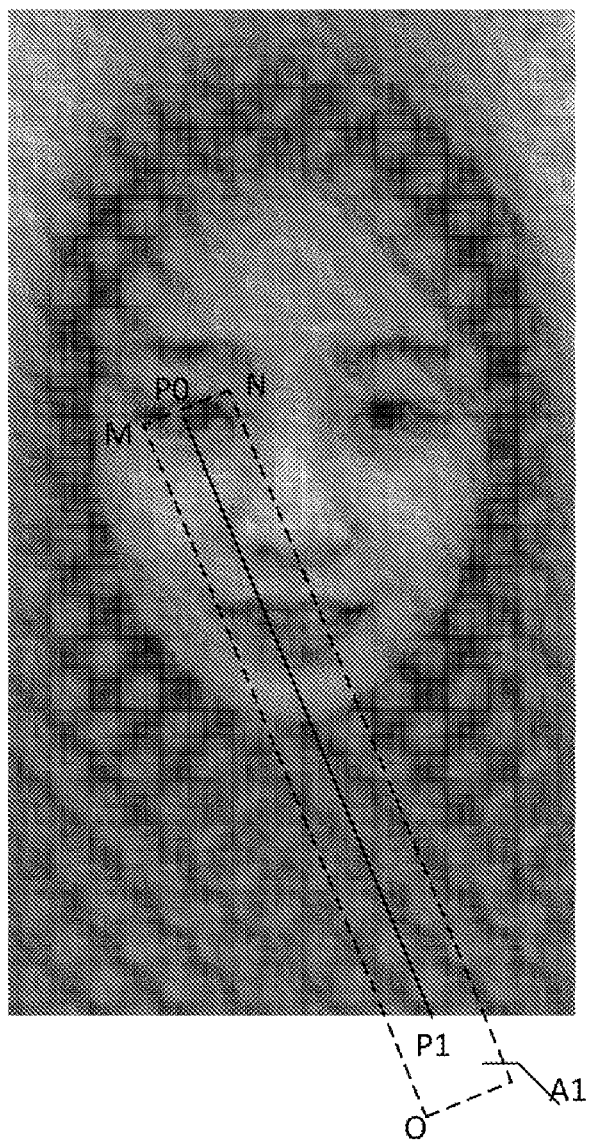
FIG. 6 is a face image shown according to an exemplary embodiment.

Exemplarily, a first side of the target area is determined firstly. The first side is the normal of the sight line segment, and the first side is the line segment whose side length is the first distance and a midpoint is the first coordinate. Afterwards, a second side of the target area is determined. The second side is a line segment which is perpendicular to the first side and the length thereof is the second length, and an intersection of the second side and the first side is located at an end point of the first side. Finally, a rectangle consisting of the first side and the second side is taken as the target area, in which the sight line segment is included. Taking the left eye shown in FIG. 6 as an example. The first coordinate and the edge coordinate for the left eye are: (P0, P1). The first side is MN, the second side is MO, and the target area for the left eye is A1, which are determined by step 1) to step 3), as shown in FIG. 6. The method for determining the target area of the right eye is the same as that of the left eye, which will not be repeated herein. The coordinates of the four vertices of A1 can be determined according to formula 2:

$$Vertex_{LeftTop} = P0 - \frac{W}{2} * (dy, dx)$$

$$Vertex_{RightTop} = P0 + \frac{W}{2} * (dy, dx)$$

$$Vertex_{LeftBottom} = P0 + H * (dy, dx) - \frac{W}{2} * (dy, dx)$$

$$Vertex_{RightBottom} = P0 + H * (dy, dx) + \frac{W}{2} * (dy, dx)$$

Formula 2 where $Vertex_{LeftTop}$ represents the coordinate of the upper left corner for A1, $Vertex_{RightTop}$ represents the coordinate of the upper right corner for A1, $Vertex_{LeftBottom}$ represents the coordinate of the lower left corner for A1, $Vertex_{RightBottom}$ represents the coordinate of the lower right corner for A1, W represents the first distance (i.e., the side length of MN), H represents the second distance (i.e., the side length of MO), dy represents sin θ, dx represents cos θ, and θ is an included angle between the sight line segment and the lower edge of the face image.

Optionally, the implementation of step 101 may be:

inputting the face image to a pre-trained sight line recognition model to obtain the first coordinate, the edge coordinate, and the depth of field distance output by the sight line recognition model.

For example, the recognition algorithm may be the pre-trained sight line recognition model to which the face image is input, and the sight line recognition model can output the first coordinate, the edge coordinate, and the depth of field distance in the face image. The sight line recognition model may be neural networks trained according to a preset sample input set and a sample output set, for example, convolutional neural networks (English: Convolutional Neural Networks, abbreviation: CNN). The convolutional neural networks are merely an example of the neural networks in embodiments of the present disclosure. The present disclosure is not limited thereto and may also include other various neural networks. The sight line recognition model may include, for example, an input layer, a convolutional layer, a feedback layer, a fully connected layer, and an output layer. Firstly, the face image is input to the input layer. Through the convolution layer, the convolution layer features are extracted from the face image. Then through the feedback layer, in combination with the previous feedback layer features and the next feedback layer features, the current feedback layer features are extracted from the convolutional layer. Afterwards, through the fully connected layer, an abstraction process is performed for the feedback layer features to generate the first coordinate, the edge coordinate and the depth of field distance of the face image. Finally, the first coordinate, the edge coordinate and the depth of field distance is output through the output layer.

Figure 7:
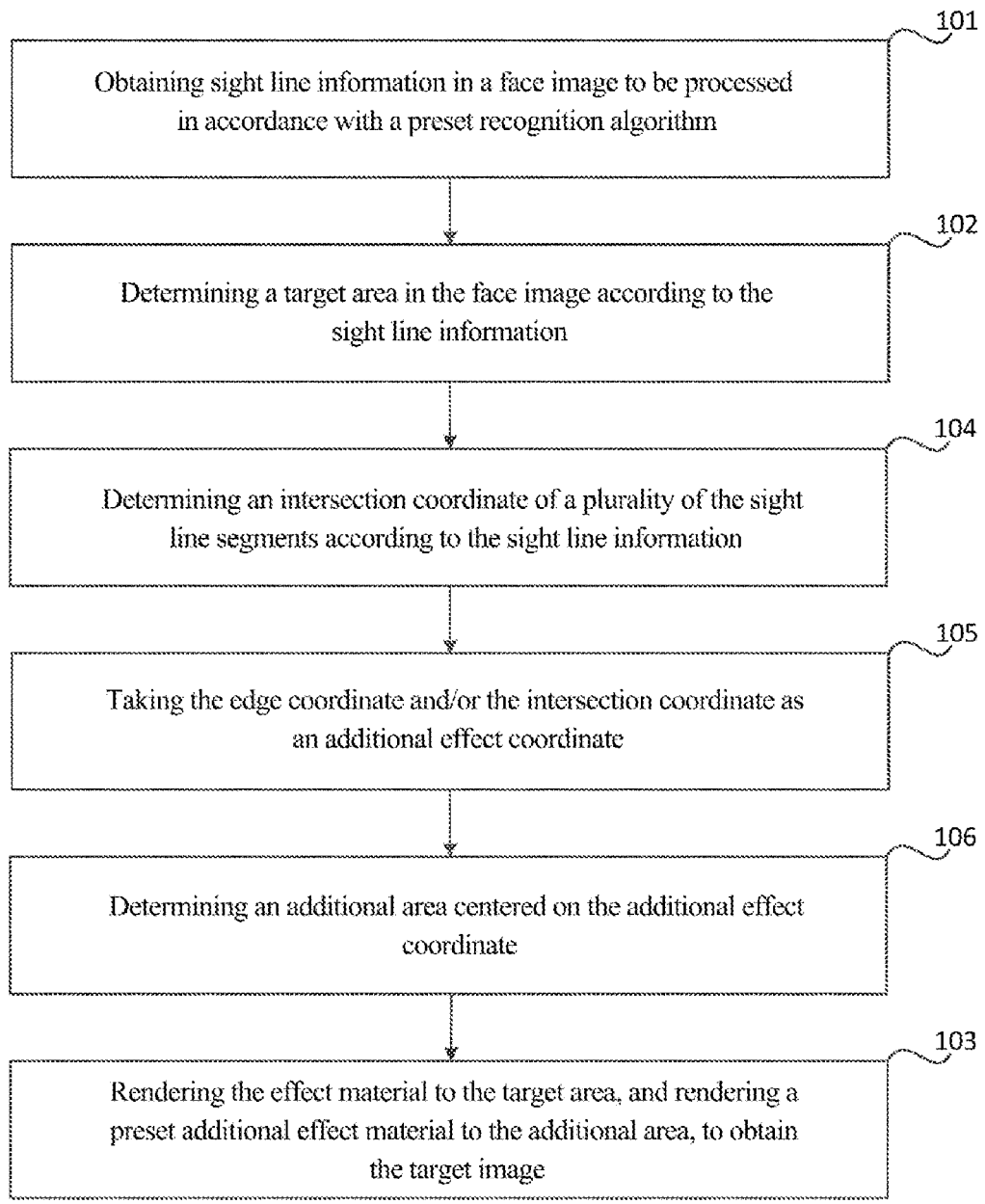
FIG. 7 is a flowchart of another face image processing method shown according to an exemplary embodiment.

FIG. 7 is a flowchart of another face image processing method shown according to an exemplary embodiment. As shown in FIG. 7, in a scene where there are a plurality of the sight line segments in the face image, after the step 102, the method further includes:

step 104, determining an intersection coordinate of a plurality of the sight line segments according to the sight line information;

step 105, taking the edge coordinate and/or the intersection coordinate as an additional effect coordinate; and step 106, determining an additional area centered on the additional effect coordinate.

Correspondingly, step 103 includes:

rendering the effect material to the target area, and rendering a preset additional effect material to the additional area, to obtain the target image.

In a specific implementation scenario, for example, the two eyes of a single face in a face image may correspond to two sight line segments respectively. The two sight line segments may intersect. For example, the face image may include a plurality of faces, and sight line segments corresponding to the plurality of faces may intersect. Also, for example, the sight lines of eyes may also intersect with an edge of the face image (that is, the point indicated by the edge coordinate). At that point, the additional effect (for example, collision, spark and the like) can be rendered at the intersecting position. Firstly, an intersection coordinate of a plurality of sight line segments is determined. The intersection coordinate may be zero (that is, a plurality of sight line segments are parallel to each other, or there is no intersection in the face image), or one or more.

Taking an example in which there are two sight line segments ab and cd in the face image, the intersection coordinate of ab and cd can be determined by the following steps.

The coordinates of the four endpoints in ab and cd are: the abscissa of a is a.x, the ordinate of a is a.y, the abscissa of b is b.x, the ordinate of b is b.y, the abscissa of c is c.x, the ordinate of c is c.y, the abscissa of d is d.x, the ordinate of d is d.y. Firstly, calculating the cross product of ac and bc:

area_abc=(a.x−c.x)*(b.y−c.y)−(a.y−c.y)*(b.x−c.x);

the cross product of ab and bd:

area_abd=(a.x−d.x)*(b.y−d.y)−(a.y−d.y)*(b.x−d.x);

the cross product of ca and da:

area_cda=(c.x−a.x)*(d.y−a.y)−(c.y−a.y)*(d.x−a.x); and the cross product of cb and db:

area_cdb=area_cda+area_abc−area_abd.

If area_abc==area_abd, it means that ab and cd are parallel to each other, that is, there is no intersection between ab and cd. If area_abc*area_abd>=0 or area_cda*area_cdb>=0, it means that ab and cd are not parallel to each other, but there is no intersection in the face image.

If the above conditions are not met, it means that there is an intersection between ab and cd, then abscissa X and ordinate Y of the intersection coordinate can be obtained by formula 3:

X=(a.x+dx)

Y=(a.y+dy)

dx=t*(b.x−a.x)

dy=t*(b.y−a.y)

t=area_cda/(area_abd−area_abc)   Formula 3 where, t can be understood as the ratio of the area of the triangle cda to the area of the quadrilateral abcd, and can also be understood as the ratio of the length from the point a to the intersection to the length of ab.

The above only takes the intersection coordinate between two sight line segments as an example. When there are more than two sight line segments, the method for determining the intersection coordinate is the same, which will not be repeated herein.

Further, if the intersection coordinate is not zero, the edge coordinate and the intersection coordinate can be taken as additional effect coordinates. If the intersection coordinate is zero, only the edge coordinate is taken as the additional effect coordinate. Then, an additional area centered on the additional effect coordinate is determined. The additional area can be a rectangle centered on the additional effect coordinate, or other shapes. After the additional area is determined, while rendering the effect material to the target area through openGL, the additional effect material can be rendered to the additional area to obtain the target image. The additional effect can also be selected by a user, and then the additional effect material corresponding to the additional effect can be found in a pre-stored additional material library according to the additional effect selected by the user.

Figure 8:
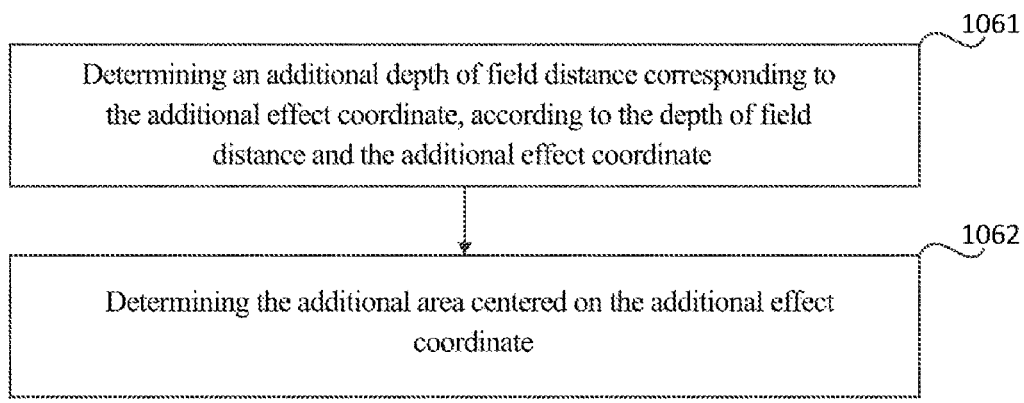
FIG. 8 is a flowchart of another face image processing method shown according to an exemplary embodiment.

FIG. 8 is a flowchart of another face image processing method shown according to an exemplary embodiment. As shown in FIG. 8, the sight line information further includes a depth of field distance, which is the distance between an eye and a lens that captures a face image. The implementation of step 106 may include:

step 1061, determining an additional depth of field distance corresponding to the additional effect coordinate according to the depth of field distance and the additional effect coordinate; and step 1062, determining the additional area centered on the additional effect coordinate, where a size of the additional area is determined according to the additional depth of field distance.

Exemplarily, in order to enable the additional effect to have a visual 3D effect, the additional area may also be determined in combination with a depth of field distance included in the sight line information. Firstly, the additional depth of field distance corresponding to the additional effect coordinate can be determined according to the depth of field distance and the additional effect coordinate. The additional depth of field distance can be determined by formula 4:

$$Z_f = Z^*(1-t) \qquad \text{Formula 4}$$

where, $Z_f$ represents the additional depth of field distance, Z represents the depth of field distance, and t is the ratio of the area of the triangle cda to the area of the quadrilateral abcd, as determined in formula 3.

Then, the size of the additional area is determined according to the additional depth of field distance, and the size of the additional area is negatively related to the additional depth of field distance. That is, the larger the additional depth of field distance is, which means that the farther the additional effect coordinate is from the lens, then the smaller the additional area is. The smaller the additional depth of field distance is, which means that the closer the additional effect coordinate is to the lens, then the larger the additional area is. Taking an example where the additional area is a square, the side length of the additional area can be determined according to formula 5:

$$W_f = 2\alpha \times \left(\frac{\pi}{2} - \arctan\left(\frac{Z_f}{\beta}\right)\right) \qquad \text{Formula 5}$$

where, $W_f$ represents the side length of the additional area, and $\alpha$ and $\beta$ are preset adjustment parameters, which are used to adjust the sensitivity of $W_f$ varying with $Z_f$. Arctangent function $$\arctan\left(\frac{Z_f}{\beta}\right)$$

is used to restrict $W_f$ from being too large or too small.

Figure 9:
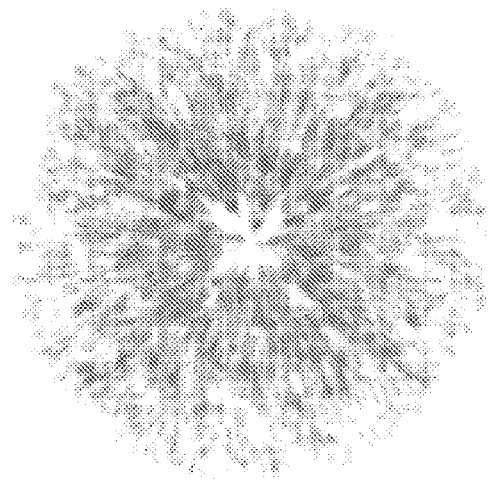
FIG. 9 is an additional effect material shown according to an exemplary embodiment.
Figure 10A:
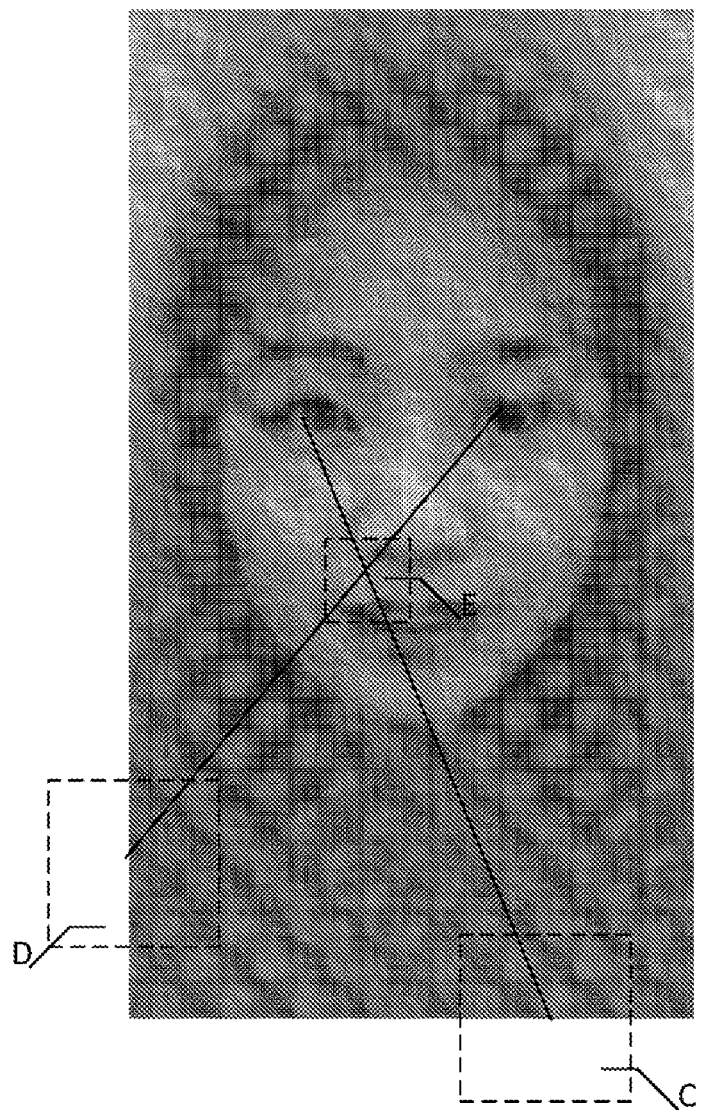
FIG. 10a is a face image shown according to an exemplary embodiment.
Figure 10B:
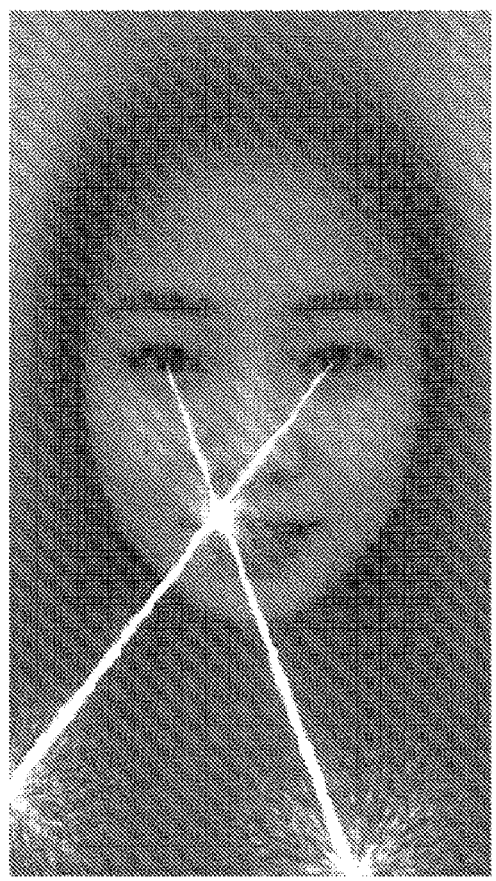
FIG. 10b is a target image shown according to an exemplary embodiment.

Taking an example where the effect material is FIG. 2, the additional effect material is FIG. 9, and the face image is FIG. 3. The determined additional areas are C, D, and E, as shown in FIG. 10*a*. FIG. 2 is rendered to the target area, and the material in FIG. 9 is rendered to the additional area, then the target image is obtained as shown in FIG. 10*b*.

It should be noted that in the above embodiment, when the effect material (or additional effect material) is rendered to the target area (or additional area), the GL_MAX_EXT mixed equation in openGL can be used to merge the layer where the effect material is located and the layer where the additional effect material is located with the layer where the face image is located, and then the color filtering mixing mode is used to mix the effect material and the additional effect material with the face image to realize rendering. Which is displayed in the target image is the result color, the color of the face image is the elementary color, the color of the effect material and the additional effect material is the blend color, and the filter color mixing formula in the filter color mixing mode can be: result color=255−[(255−elementary color)*(255−blend color)]/255.

In summary, in the present disclosure: firstly recognizing a face image to be processed in accordance with a preset recognition algorithm to obtain sight line information including a first coordinate and an edge coordinate for an eye, where the edge coordinate is used to indicate an intersection of a sight line of the eye and an edge of the face image; then determining a target area including a sight line segment with the first coordinate and the edge coordinate as endpoints in the face image according to the sight line information; finally rendering a preset effect material to the target area to obtain a target image. In the present disclosure, through identifying the sight line information included in the face image, determining the target area that needs to be rendered, then rendering the effect material to the target area, so that the rendering effect can follow the sight line of an eye.

Figure 11:
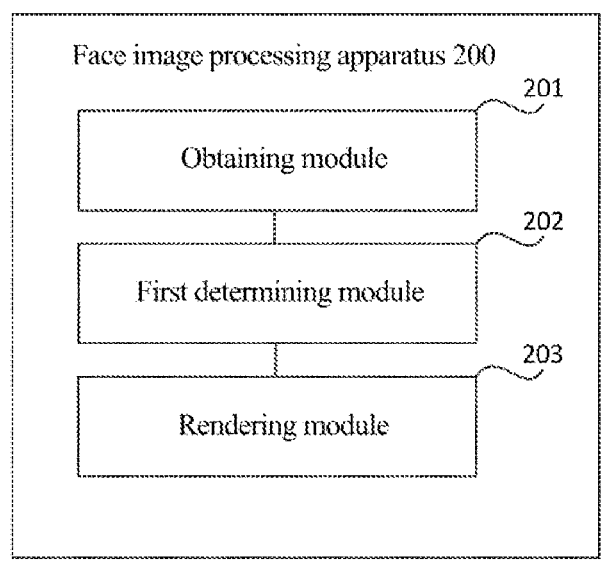
FIG. 11 is a block diagram of a face image processing apparatus shown according to an exemplary embodiment.

FIG. 11 is a block diagram of a face image processing apparatus shown according to an exemplary embodiment. As shown in FIG. 11, the apparatus 200 includes:
  an obtaining module 201, configured to obtain sight line information in a face image to be processed in accordance with a preset recognition algorithm, where the sight line information includes: a first coordinate and an edge coordinate for an eye, and the edge coordinate is used to indicate an intersection of a sight line of the eye and an edge of the face image;
  a first determining module 202, configured to determine a target area in the face image according to the sight line information, where the target area includes a sight line segment with the first coordinate and the edge coordinate as endpoints; and
  a rendering module 203, configured to render a preset effect material to the target area to obtain a target image.

Figure 12:
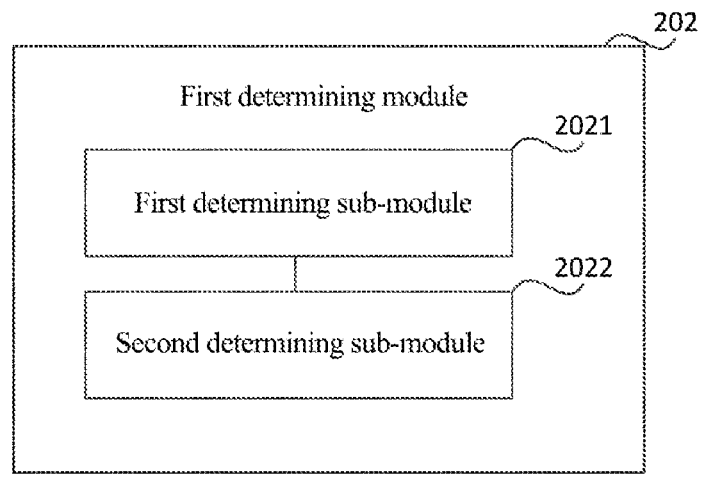
FIG. 12 is a block diagram of another face image processing apparatus shown according to an exemplary embodiment.

FIG. 12 is a block diagram of another face image processing apparatus shown according to an exemplary embodiment. As shown in FIG. 12, the sight line information further includes a depth of field distance, which is the distance between eyes to the lens that capture the face image. The first determining module 202 includes:
  a first determining sub-module 2021, configured to determine a first distance according to the depth of field distance, and determine a second distance according to an image size of the face image, where the first distance is negatively correlated with depth of field distance, and the second distance is positively correlated with the image size; and
  a second determining sub-module 2022, configured to take a rectangular area, including a sight line segment and having width of the first distance, and length of the second distance, as the target area.

Optionally, the rendering module 203 is configured to:
  adjust a size of the effect material in accordance with the first distance and the second distance, and render the adjusted effect material to the target area, to obtain the target image.
Optionally, the second determining sub-module 2022 is configured to perform the following steps:
  step 1), determining a first side, where side length of the first side is the first distance, a midpoint of the first side is the first coordinate, and the first side is perpendicular to the sight line segment;
  step 2), determining a second side, where side length of the second side is the second distance, and the second side is perpendicular to the first side; and
  step 3), taking, a rectangle consisting of the first side and the second side and including the sight line segment, as the target area.
Optionally, the obtaining module 201 is configured to:
  input the face image to a pre-trained sight line recognition model to obtain the first coordinate, the edge coordinate, and the depth of field distance output by the sight line recognition model.

Figure 13:
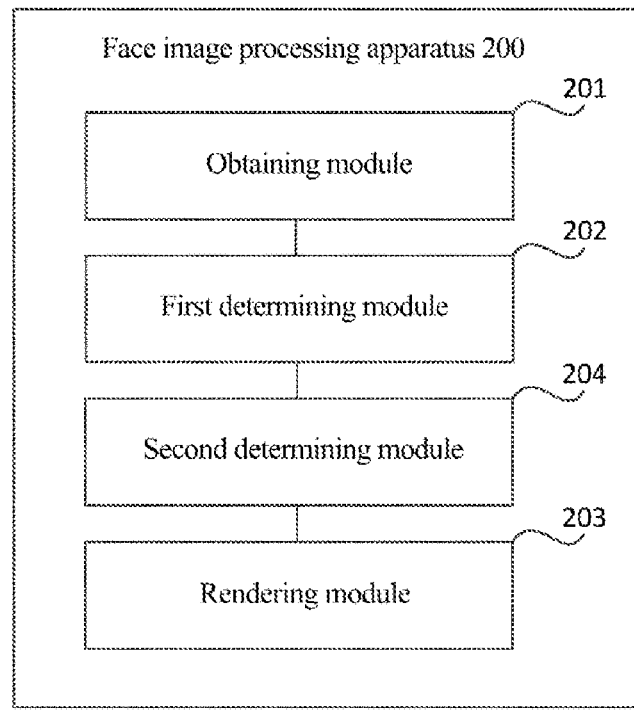
FIG. 13 is a block diagram of another face image processing apparatus shown according to an exemplary embodiment.

FIG. 13 is a block diagram of another face image processing apparatus shown according to an exemplary embodiment. As shown FIG. 13, there are a plurality of sight line segments in a face image, the apparatus 200 further including:
  a second determining module 204, configured to:
  determine an intersection coordinate of a plurality of sight line segments according to the sight line information, after the determining the target area in the face image according to the sight line information;
  take the edge coordinate and/or the intersection coordinate as an additional effect coordinate; and
  determine an additional area centered on the additional effect coordinate; and
  a rendering module 203, configured to render the effect material to the target area, and render a preset additional effect material to the additional area, to obtain the target image.

Figure 14:
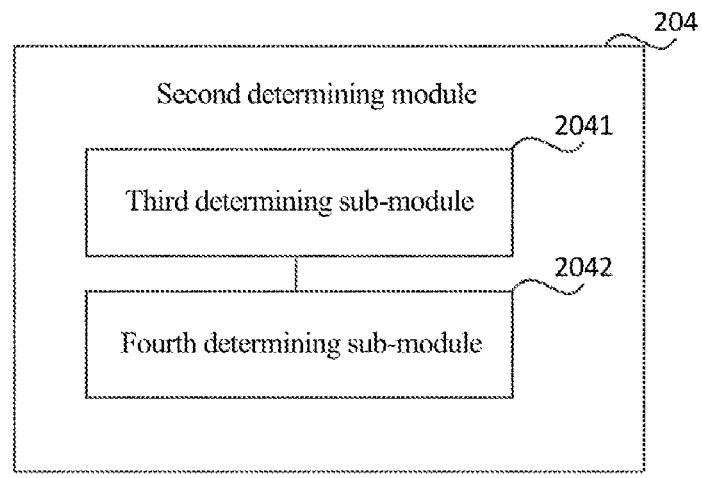
FIG. 14 is a block diagram of another face image processing apparatus shown according to an exemplary embodiment.

FIG. 14 is a block diagram of another face image processing apparatus shown according to an exemplary embodiment. As shown in FIG. 14, the second determining module 204 includes:
  a third determining sub-module 2041, configured to determine an additional depth of field distance corresponding to the additional effect coordinate according to the depth of field distance and the additional effect coordinate; and
  a fourth determining sub-module 2042, configured to determine the additional area centered on the additional effect coordinate, where a size of the additional area is determined according to the additional depth of field distance.

As for the apparatus in the above embodiment, the specific manners of operations performed by respective modules have been described in detail in an embodiment regarding the method, which will not be described in detail herein.

In summary, in the present disclosure: firstly recognizing a face image to be processed in accordance with a preset recognition algorithm to obtain sight line information including a first coordinate and an edge coordinate for an eye, where the edge coordinate is used to indicate an intersection of a sight line of the eye and an edge of the face image; then determining a target area including a sight line segment with the first coordinate and the edge coordinate as endpoints in the face image according to the sight line information; finally rendering a preset effect material to the target area to obtain a target image. In the present disclosure, through identifying the sight line information included in the face image, determining the target area that needs to be rendered, then rendering the effect material to the target area, so that the rendering effect can follow the sight line of an eye.

Figure 15:
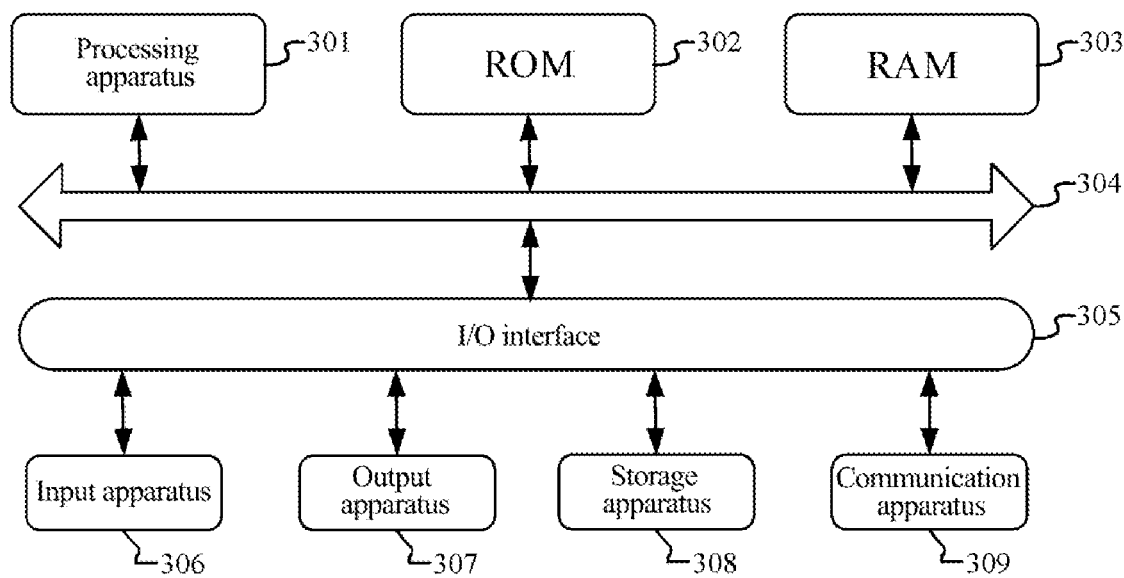
FIG. 15 is a schematic structural diagram of an electronic device shown according to an exemplary embodiment.

Referring to FIG. 15 below, it shows a schematic structural diagram of an electronic device 300 suitable for implementing embodiments of the present disclosure. The electronic device (i.e., execution entity of image processing method above) in embodiments of present disclosure may be a server. The server may be, for example, a local server, or a cloud server, or may be a terminal device. The terminal device may include, but not be limited to a mobile terminal such as a mobile phone, a laptop, a digital broadcast receiver, a PDA (Personal Digital Assistant), a PAD (Portable Android Device), a PMA (Portable Media Player), a vehicle-mounted terminal (for example a vehicle-mounted navigation terminal) or the like, and a fixed terminal such as a digital TV, a desktop computer or the like. A user may upload the face image by logging in to the server, may also directly upload the face image through the terminal device, or collect the face image through the terminal device. The electronic device shown in FIG. 15 is merely an example, and should not impose any restrictions on the function and the range of use of the embodiments of the present disclosure.

As shown in FIG. 15, the electronic device 300 may include a processing apparatus (such as a central processor, a graphics processor and the like) 301, which may perform various appropriate actions and processing according to a program stored in a read only memory (ROM) 302 or a program loaded from a storage apparatus 308 to a random access memory (RAM) 303. In the RAM 303, various programs and data required for the operation of the electronic device 300 are also stored. The processing apparatus 301, the ROM 302, and the RAM 303 are connected with each other through a bus 304. An input/output (I/O) interface 305 is also connected to the bus 304.

Generally, the following apparatuses may be connected to the I/O interface 305: an input apparatus 306, including, for example, a touch screen, a touch panel, a keyboard, a mouse, a camera, a microphone, an accelerometer, a gyroscope, and the like; an output apparatus 307, including for example a liquid crystal display (LCD), a speaker, a vibrator, and the like; a storage apparatus 308, including for example a magnetic tape, a hard disk, and the like; and a communication apparatus 309. The communication apparatus 309 may allow the electronic device 300 to perform wireless or wired communication with other devices to exchange data. Although FIG. 15 shows the electronic device 300 with multiple kinds of apparatuses, it should be understood that it is not required to implement or have all the apparatuses shown. It may alternatively be implemented or provided with more or fewer apparatuses.

In particular, according to embodiments of the present disclosure, the process described above with reference to the flowchart may be implemented as a computer software program. For example, an embodiment of the present disclosure includes a computer program product, which includes a computer program carried on a non-transitory computer readable medium. The computer program contains program codes for executing the method shown in the flowcharts. In such an embodiment, the computer program may be downloaded from a network and installed through the communication apparatus 309, or installed from the storage apparatus 308, or installed from the ROM 302. When the computer program is executed by the processing apparatus 301, the above-mentioned functions defined in methods of embodiments of the present disclosure are executed.

It should be noted that, the above-mentioned computer readable medium in the present disclosure may be a computer readable signal medium or a computer readable storage medium or any combination of the both. The computer readable storage medium may be, for example, but not limited to, an electrical, magnetic, optical, electromagnetic, infrared, or semiconductor system, apparatus or device, or any combination of the above. A more specific example of the computer readable storage medium may include, but is not limited to: an electrically connected portable computer disk with one or more wires, a hard disk, a random access memory (RAM), a read only memory (ROM), an erasable programmable read only memory (EPROM) or a flash, an optical fiber, a portable compact disc read only memory (CD-ROM), an optical storage device, a magnetic storage device, or any suitable combination of the above. In the present disclosure, the computer readable storage medium may be any tangible medium that contains or stores a program, and the program may be used by or in combination with an instruction execution system, apparatus, or device. In the present disclosure, a computer readable signal medium may include a data signal propagated in a baseband or propagated as a part of a carrier wave, and a computer readable program code is carried therein. This propagated data signal may adopt many forms, including but not limited to, an electromagnetic signal, an optical signal, or any suitable combination of the above. The computer readable signal medium may also be any computer readable medium other than the computer readable storage medium, the computer readable signal medium may send, propagate, or transmit the program used by or in combination with the instruction execution system, apparatus, or device. The program code contained on the computer readable medium may be transmitted by any suitable medium, including but not limited to: a wire, an optical cable, RF (Radio Frequency), etc., or any suitable combination of the above.

In some embodiments, terminal device and server can perform communication through using any currently known or future developed network protocol such as HTTP (Hyper Text Transfer Protocol, Hyper Text Transfer Protocol), and can interconnect with any form or medium of digital data communication (for example, communication network). Examples of communication networks include a local area network ("LAN"), a wide area network ("WAN"), an internetwork (for example, the Internet), and peer-to-peer networks (for example, ad hoc peer-to-peer networks), as well as any currently known or future developed network.

The above-mentioned computer readable medium may be included in the above-mentioned electronic device; or it may exist alone without being assembled into the electronic device.

The above-mentioned computer readable medium carries thereon one or more programs which, when executed by the electronic device, enable the electronic device to: obtain sight line information in a face image to be processed in accordance with a preset recognition algorithm, where the sight line information includes a first coordinate and an edge coordinate for an eye, and the edge coordinate is used to indicate an intersection of a sight line of an eye and an edge of the face image; determine a target area in the face image according to the sight line information, where the target area includes a sight line segment with the first coordinate and the edge coordinate as endpoints; and render the preset effect material to the target area to obtain the target image.

Computer program codes used to perform operations of the present disclosure may be written in one or more programming languages or a combination thereof. The above-mentioned programming languages include, but does not be limited to, an object-oriented programming language, such as Java, Smalltalk, C++, and also include a conventional procedural programming language, such as "C" language or similar programming language. Program codes may be executed entirely on a computer of a user, partly on a computer of a user, executed as an independent software package, partly executed on a computer of a user and partly executed on a remote computer, or entirely executed on a remote computer or a server. In a case where a remote computer is involved, the remote computer may be connected to the computer of the user through any kind of network including a local area network (LAN) or a wide area network (WAN), or, may be connected to an external computer (for example, connected via the Internet utilizing an Internet service provider).

The flowcharts and block diagrams in the accompanying drawings illustrate architecture, functions, and operations of possible implementations of the system, method, and computer program product in accordance with various embodiments of the present disclosure. In this point, each block in the flowcharts or block diagrams may represent a module, a program segment, or a part of codes, and the module, the program segment, or the part of codes contains one or more executable instructions for implementing a designated logical function. It should also be noted that, in some alternative implementations, the functions marked in the blocks may also occur in a different order from the order marked in the drawings. For example, two blocks shown one after another may actually be executed substantially in parallel, or sometimes may be executed in a reverse order, which depends on the functions involved. It should also be noted that, each block in the block diagrams and/or flowcharts, and a combination of blocks in the block diagrams and/or flowcharts, may be implemented by a dedicated hardware-based system that performs designated functions or operations, or may be implemented by a combination of dedicated hardware and computer instructions.

The modules described in embodiments of the present disclosure can be implemented in software or in hardware. In some cases, the name of a module does not constitute a restriction on the module itself. For example, the first determining module can also be described as "a module for determining the target area".

The functions described above herein may be performed at least in part by one or more hardware logic components. For example, non-restrictively, exemplary types of hardware logic components that may be used include: a field programmable gate array (FPGA), an application specific integrated circuit (ASIC), an application specific standard product (ASSP), a system on chip (SOC), a complex programmable logic device (CPLD), and the like.

In the context of the present disclosure, a machine-readable medium may be a tangible medium that may contain or store programs for use by or in combination with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above. A more specific example of the machine-readable storage medium may include: an electrically connected portable computer disk with one or more wires, a hard disk, a random access memory (RAM), a read only memory (ROM), an erasable programmable read only memory (EPROM) or a flash memory, an optical fiber, a portable compact disc read only memory (CD-ROM), an optical storage device, a magnetic storage device, or any suitable combination of the above.

According to one or more embodiments of the present disclosure, Example 1 provides a face image processing method, including: obtaining sight line information in a face image to be processed in accordance with a preset recognition algorithm, where the sight line information includes: a first coordinate and an edge coordinate for an eye, and the edge coordinate is used to indicate an intersection of a sight line of the eye and an edge of the face image; determining a target area in the face image according to the sight line information, where the target area includes a sight line segment with the first coordinate and the edge coordinate as endpoints; and rendering a preset effect material to the target area to obtain a target image.

According to one or more embodiments of the present disclosure, Example 2 provides the method of Example 1, where the sight line informations further includes a depth of field distance, and the depth of field distance is a distance between the eye and a lens that captures the face image; where determining the target area in the face image according to the sight line information includes: determining a first distance according to the depth of field distance, and determining a second distance according to an image size of the face image, where the first distance is negatively correlated with the depth of field distance, and the second distance is positively correlated with the image size; and taking a rectangular area including the sight line segment and having width of the first distance, and length of the second distance, as the target area.

According to one or more embodiments of the present disclosure, Example 3 provides the method of Example 2, where rendering the preset effect material to the target area to obtain the target image includes: adjusting a size of the effect material in accordance with the first distance and the second distance, and rendering the adjusted effect material to the target area, to obtain the target image.

According to one or more embodiments of the present disclosure, Example 4 provides the method of Example 2, where taking, the rectangular area including the sight line segment and having width of the first distance, and length of the second distance, as the target area, includes: determining a first side, where side length of the first side is the first distance, a midpoint of the first side is the first coordinate, and the first side is perpendicular to the sight line segment; determining a second side, where side length of the second side is the second distance, and the second side is perpendicular to the first side; and taking, a rectangle consisting of the first side and the second side and including the sight line segment, as the target area.

According to one or more embodiments of the present disclosure, Example 5 provides the method of any one of Example 2 to Example 4, where obtaining sight line information in the face image to be processed in accordance with the preset recognition algorithm includes: inputting the face image to a pre-trained sight line recognition model to obtain the first coordinate, the edge coordinate, and the depth of field distance output by the sight line recognition model.

According to one or more embodiments of the present disclosure, Example 6 provides the method of any one of Example 1 to Example 4, where there are a plurality of the sight line segments in the face image, after the determining the target area in the face image according to the sight line information, the method further includes: determining an intersection coordinate of a plurality of the sight line segments according to the sight line information; taking the edge coordinate and/or the intersection coordinate as an additional effect coordinate; and determining an additional area centered on the additional effect coordinate; where rendering the preset effect material to the target area to obtain the target image includes: rendering the effect material to the target area, and rendering a preset additional effect material to the additional area, to obtain the target image.

According to one or more embodiments of the present disclosure, Example 7 provides the method of Example 6, where the sight line information further includes a depth of field distance, and the depth of field distance is a distance between the eye and a lens that captures the face image; where determining the additional area centered on the additional effect coordinate includes: determining an additional depth of field distance corresponding to the additional effect coordinate according to the depth of field distance and the additional effect coordinate; and determining the additional area centered on the additional effect coordinate, where a size of the additional area is determined according to the additional depth of field distance.

According to one or more embodiments of the present disclosure, Example 8 provides a face image processing apparatus, the apparatus including: an obtaining module, configured to obtain sight line information in a face image to be processed in accordance with a preset recognition algorithm, where the sight line information includes: a first coordinate and an edge coordinate for an eye, and the edge coordinate is used to indicate an intersection of the sight line of the eye and an edge of the face image; a first determining module, configured to determine a target area in the face image according to the sight line information, where the target area includes a sight line segment with the first coordinate and the edge coordinate as endpoints; and a rendering module, configured to render a preset effect material to the target area to obtain a target image.

According to one or more embodiments of the present disclosure, Example 9 provides a computer-readable medium, which stores a computer program thereon which, when executed by a processing apparatus, implements steps of the method described in Example 1 to Example 7.

According to one or more embodiments of the present disclosure, Example 10 provides an electronic device, including: a storage apparatus, which stores a computer program thereon; and a processing apparatus, configured to execute the computer program in the storage apparatus to implement the steps of the method described in Example 1 to Example 7.

According to one or more embodiments of the present disclosure, Example 11 provides a computer program, including program codes, when a computer runs the computer program, the program codes are executed to implement the steps of the method described in Example 1 to Example 7.

The above description is merely intended for preferred embodiments of the present disclosure and an illustration of the applied technical principles. Those skilled in the art should understand that, the disclosure scope involved in the present disclosure is not limited to the technical solutions formed by a specific combination of the above technical features, but also should cover other technical solutions formed by an arbitrary combination of the above technical features or their equivalent features without departing from the above disclosure concept, for example, a technical solution formed by a replacement of the above features with technical features with similar functions disclosed (but not limited to) in the present disclosure.

In addition, although respective operations are described in a specific order, this should not be interpreted as requiring these operations to be performed in the specific order shown or in a sequential order. Under certain circumstances, multitasking and parallel processing may be advantageous. Similarly, although several specific implementation details are included in the above discussion, these should not be interpreted as limiting the scope of the present disclosure. Certain features described in the context of a single embodiment may also be implemented in combination in the single embodiment. Conversely, various features described in the context of a single embodiment may also be implemented in multiple embodiments individually or in any suitable sub-combination.

Although the present subject matter has been described in language specific to structural features and/or method logical actions, it should be understood that the subject matter defined in the appended claims is not limited to the specific features or actions described above. On the contrary, the specific features and actions described above are only exemplary forms for implementing the claims. Regarding the apparatus in the foregoing embodiment, in which the specific manners of performing operations by respective modules have been described in detail in the embodiment regarding the methods, which will not be described in detail herein.

The invention claimed is:

1. A face image processing method, comprising:
obtaining sight line information in a face image to be processed in accordance with a preset recognition algorithm, wherein the sight line information comprises: a first coordinate and an edge coordinate for an eye, and the edge coordinate is used to indicate an intersection of a sight line of the eye and an edge of the face image;
determining a target area in the face image according to the sight line information, wherein the target area comprises a sight line segment with the first coordinate and the edge coordinate as endpoints; and
rendering a preset effect material to the target area to obtain a target image.

2. The method according to claim 1, wherein the sight line information further comprises a depth of field distance, and the depth of field distance is a distance between the eye and a lens that captures the face image;
wherein determining the target area in the face image according to the sight line information comprises:
determining a first distance according to the depth of field distance, and determining a second distance according to an image size of the face image, wherein the first distance is negatively correlated with the depth of field distance, and the second distance is positively correlated with the image size; and
taking, a rectangular area comprising the sight line segment and having width of the first distance, and length of the second distance, as the target area.

3. The method according to claim 2, wherein rendering the preset effect material to the target area to obtain the target image comprises:
adjusting a size of the effect material in accordance with the first distance and the second distance, and rendering the adjusted effect material to the target area, to obtain the target image.

4. The method according to claim 2, wherein taking, the rectangular area comprising the sight line segment and having width of the first distance, and length of the second distance, as the target area, comprising:
  determining a first side, wherein side length of the first side is the first distance, a midpoint of the first side is the first coordinate, and the first side is perpendicular to the sight line segment;
  determining a second side, wherein side length of the second side is the second distance, and the second side is perpendicular to the first side; and
  taking, a rectangle consisting of the first side and the second side and comprising the sight line segment, as the target area.

5. The method according to claim 2, wherein obtaining sight line information in the face image to be processed in accordance with the preset recognition algorithm comprises:
  inputting the face image to a pre-trained sight line recognition model to obtain the first coordinate, the edge coordinate, and the depth of field distance output by the sight line recognition model.

6. The method according to claim 1, wherein there are a plurality of the sight line segments in the face image, after the determining the target area in the face image according to the sight line information, the method further comprises:
  determining an intersection coordinate of a plurality of the sight line segments according to the sight line information;
  taking at least one of the following as an additional effect coordinate:
  the edge coordinate and the intersection coordinate; and
  determining an additional area centered on the additional effect coordinate;
  wherein rendering the preset effect material to the target area to obtain the target image comprises:
  rendering the effect material to the target area, and rendering a preset additional effect material to the additional area, to obtain the target image.

7. The method according to claim 6, wherein the sight line information further comprises a depth of field distance, and the depth of field distance is a distance between the eye and a lens that captures the face image;
  wherein determining the additional area centered on the additional effect coordinate comprises:
  determining an additional depth of field distance corresponding to the additional effect coordinate according to the depth of field distance and the additional effect coordinate, and
  determining the additional area centered on the additional effect coordinate, wherein a size of the additional area is determined according to the additional depth of field distance.

8. A face image processing apparatus, comprising:
  at least one processor;
  a memory;
  wherein the memory stores computer execution instructions; and
  the processor is configured to call and run the computer execution instructions stored in the memory to:
  obtain sight line information in a face image to be processed in accordance with a preset recognition algorithm, wherein the sight line information comprises: a first coordinate and an edge coordinate for an eye, and the edge coordinate is used to indicate an intersection of a sight line of the eye and an edge of the face image;
  determine a target area in the face image according to the sight line information, wherein the target area comprises a sight line segment with the first coordinate and the edge coordinate as endpoints; and
  render a preset effect material to the target area to obtain a target image.

9. The apparatus according to claim 8, wherein the sight line information further comprises a depth of field distance, and the depth of field distance is a distance between the eye and a lens that captures the face image;
  wherein the processor is further configured to:
  determine a first distance according to the depth of field distance, and determine a second distance according to an image size of the face image, wherein the first distance is negatively correlated with the depth of field distance, and the second distance is positively correlated with the image size; and
  take, a rectangular area comprising the sight line segment and having width of the first distance, and length of the second distance, as the target area.

10. The apparatus according to claim 9, wherein the processor is further configured to:
  adjust a size of the effect material in accordance with the first distance and the second distance, and render the adjusted effect material to the target area, to obtain the target image.

11. The apparatus according to claim 9, wherein the processor is further configured to:
  determine a first side, wherein side length of the first side is the first distance, a midpoint of the first side is the first coordinate, and the first side is perpendicular to the sight line segment;
  determine a second side, wherein side length of the second side is the second distance, and the second side is perpendicular to the first side; and
  take a rectangle consisting of the first side and the second side and comprising the sight line segment, as the target area.

12. The apparatus according to claim 9, wherein the processor is further configured to:
  input the face image to a pre-trained sight line recognition model to obtain the first coordinate, the edge coordinate, and the depth of field distance output by the sight line recognition model.

13. The apparatus according to claim 8, wherein there are a plurality of the sight line segments in the face image; and the processor is further configured to:
  after the determining the target area in the face image according to the sight line information,
  determine an intersection coordinate of a plurality of the sight line segments according to the sight line information;
  take at least one of following as an additional effect coordinate:
  the edge coordinate and the intersection coordinate;
  determine an additional area centered on the additional effect coordinate; and
  render the effect material to the target area, and rendering a preset additional effect material to the additional area, to obtain the target image.

14. The apparatus according to claim 13, wherein the sight line information further comprises a depth of field distance, and the depth of field distance is a distance between the eye and a lens that captures the face image;
  wherein the processor is further configured to:
  determine an additional depth of field distance corresponding to the additional effect coordinate according to the depth of field distance and the additional effect coordinate, and determine the additional area centered on the additional effect coordinate, wherein a size of the additional area is determined according to the additional depth of field distance.

15. A computer readable storage medium, which stores thereon a computer program which, when executed by a processing apparatus, causes the processing apparatus to:
obtain sight line information in a face image to be processed in accordance with a preset recognition algorithm, wherein the sight line information comprises: a first coordinate and an edge coordinate for an eye, and the edge coordinate is used to indicate an intersection of a sight line of the eye and an edge of the face image;
determine a target area in the face image according to the sight line information, wherein the target area comprises a sight line segment with the first coordinate and the edge coordinate as endpoints; and
render a preset effect material to the target area to obtain a target image.

16. The computer readable storage medium according to claim 15, wherein the sight line information further comprises a depth of field distance, and the depth of field distance is a distance between the eye and a lens that captures the face image;
wherein the computer program is used to cause the processor to:
determine a first distance according to the depth of field distance, and determine a second distance according to an image size of the face image, wherein the first distance is negatively correlated with the depth of field distance, and the second distance is positively correlated with the image size; and
take, a rectangular area comprising the sight line segment and having width of the first distance, and length of the second distance, as the target area.

17. The computer readable storage medium according to claim 16, wherein the computer program is used to cause the processor to:
adjust a size of the effect material in accordance with the first distance and the second distance, and render the adjusted effect material to the target area, to obtain the target image.

18. The computer readable storage medium according to claim 16, wherein the computer program is used to cause the processor to:
determine a first side, wherein side length of the first side is the first distance, a midpoint of the first side is the first coordinate, and the first side is perpendicular to the sight line segment;
determine a second side, wherein side length of the second side is the second distance, and the second side is perpendicular to the first side; and
take a rectangle consisting of the first side and the second side and comprising the sight line segment, as the target area.

19. The computer readable storage medium according to claim 16, wherein the computer program is used to cause the processor to:
input the face image to a pre-trained sight line recognition model to obtain the first coordinate, the edge coordinate, and the depth of field distance output by the sight line recognition model.

20. The computer readable storage medium according to claim 16, wherein the computer program is used to cause the processor to:
after the determining the target area in the face image according to the sight line information, determine an intersection coordinate of a plurality of the sight line segments according to the sight line information;
take at least one of following as an additional effect coordinate:
the edge coordinate and the intersection coordinate;
determine an additional area centered on the additional effect coordinate; and
render the effect material to the target area, and rendering a preset additional effect material to the additional area, to obtain the target image.

* * * * *